(12) United States Patent
Wicker

(10) Patent No.: US 10,578,199 B2
(45) Date of Patent: Mar. 3, 2020

(54) METHOD FOR GENERATING A TOOTH PROFILE OF A WHEEL ENGAGING WITH A ROLLER PINION

(71) Applicant: SAFRAN LANDING SYSTEMS, Velizy Villacoublay (FR)

(72) Inventor: Paul Wicker, Antony (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 141 days.

(21) Appl. No.: 15/794,163

(22) Filed: Oct. 26, 2017

(65) Prior Publication Data

US 2018/0149258 A1 May 31, 2018

(30) Foreign Application Priority Data

Nov. 28, 2016 (FR) ...................................... 16 61596

(51) Int. Cl.
| | |
|---|---|
| *F16H 55/08* | (2006.01) |
| *F16H 55/10* | (2006.01) |
| *B23P 15/14* | (2006.01) |
| *F16H 1/06* | (2006.01) |
| *F16H 1/26* | (2006.01) |

(52) U.S. Cl.
CPC .............. *F16H 55/08* (2013.01); *B23P 15/14* (2013.01); *F16H 1/06* (2013.01); *F16H 1/26* (2013.01); *F16H 55/088* (2013.01); *F16H 55/10* (2013.01)

(58) Field of Classification Search
CPC .. F16H 55/10; F16H 55/08; F16H 2055/0866; F16H 55/088; F16H 2055/0893; F16H 55/30; F16H 1/26; F16H 1/06; Y10T 74/19981; Y10T 29/49462; Y10T 29/49467; B23F 15/005; B23P 15/14
See application file for complete search history.

(56) References Cited

U.S. PATENT DOCUMENTS

| | | | | |
|---|---|---|---|---|
| 4,116,081 | A * | 9/1978 | Luttrell | B62D 55/12 |
| | | | | 474/156 |
| 4,394,112 | A * | 7/1983 | Woodling | F01C 1/113 |
| | | | | 418/61.3 |

(Continued)

FOREIGN PATENT DOCUMENTS

EP    0 851 150 A1    7/1998

OTHER PUBLICATIONS

French Search Report of FR 1661596 dated Jul. 20, 2017.

*Primary Examiner* — Matthew P Travers
(74) *Attorney, Agent, or Firm* — Sughrue Mion, PLLC

(57) ABSTRACT

A method for generating a tooth space profile between two teeth of a wheel engaging with a roller pinion in a reference plane perpendicular to a central axis ($X1$) whose intersection with the reference plane defines a centre (C). The method comprises defining a nominal tooth space with symmetrical first and second profiles so that the space is suitable for receiving a roller which comes into contact, without clearance, with the facing active portions of the first and second profiles at the level of a primitive diameter. The method further comprises the steps of deforming the bottom portion of the first profile so that the bottom point is brought nearer to the centre by an amount equal to a given radial clearance, and moving the first profile angularly through a given angular half-clearance around the centre to shift it away from the radial axis.

1 Claim, 2 Drawing Sheets

(56) References Cited

U.S. PATENT DOCUMENTS

| | | | | |
|---|---|---|---|---|
| 4,879,920 | A | | 11/1989 | Kerkhoff |
| 4,998,442 | A | * | 3/1991 | Brown ................... B23Q 1/012 |
| | | | | 74/422 |
| 5,247,847 | A | | 9/1993 | Gu |
| 5,848,948 | A | * | 12/1998 | Allen ....................... F16H 7/06 |
| | | | | 474/156 |
| 2012/0090415 | A1 | * | 4/2012 | Lim ....................... F16H 19/04 |
| | | | | 74/89.17 |
| 2013/0330222 | A1 | * | 12/2013 | Blechschmidt ......... F04C 2/084 |
| | | | | 418/61.3 |
| 2017/0066529 | A1 | * | 3/2017 | Wilson .................. B64C 25/405 |

\* cited by examiner

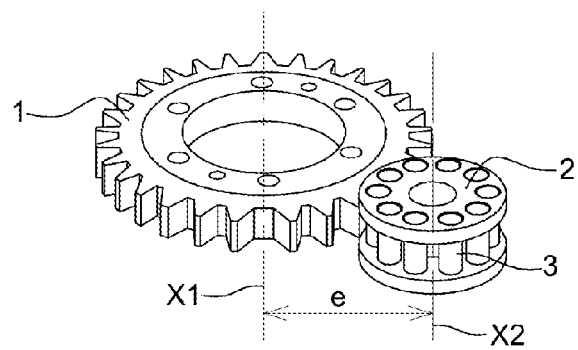
Fig. 1
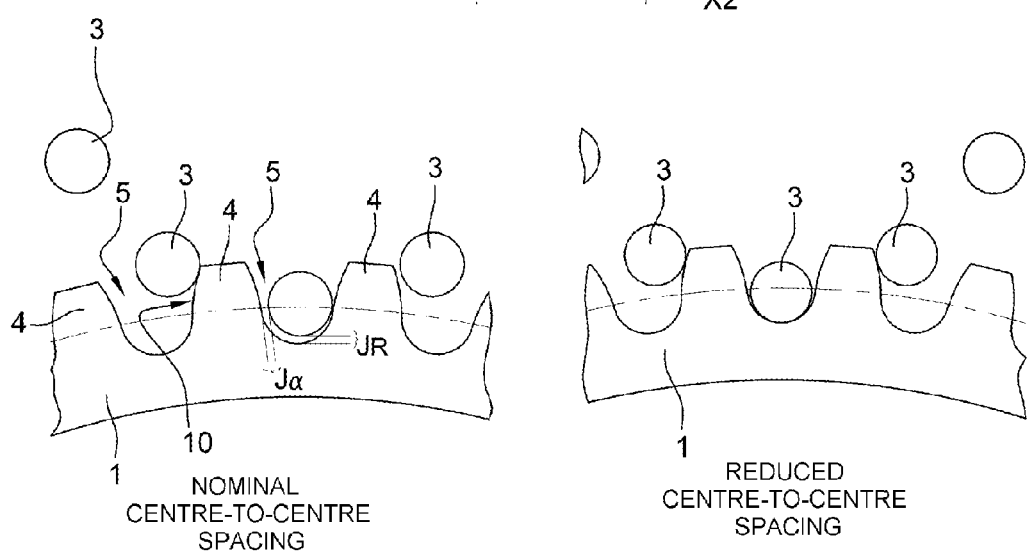
Fig. 2A — NOMINAL CENTRE-TO-CENTRE SPACING
Fig. 2B — REDUCED CENTRE-TO-CENTRE SPACING
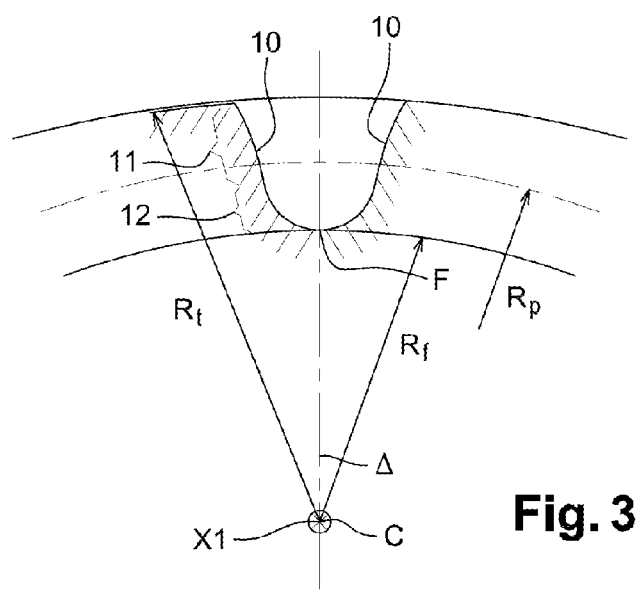
Fig. 3

METHOD FOR GENERATING A TOOTH PROFILE OF A WHEEL ENGAGING WITH A ROLLER PINION

The invention relates to a method for generating a tooth profile of a wheel engaging with a roller pinion.

TECHNICAL BACKGROUND

There are known gear wheels which engage with a roller pinion. Such gearing systems are intended for use in applications for driving aircraft wheels by means of an electric motor which drives a roller pinion engaging with a gear wheel, which is fixed to the aircraft wheel. However, because of the deformation of the landing gear that carries the aircraft wheel, and the deformation of the aircraft wheel itself, the centre-to-centre spacing varies over a significant range, and this must be taken into account in order to avoid any premature wear, or even jamming. In particular, deformation may cause a reduction in the centre-to-centre spacing, and provision must be made to ensure that the rollers are not trapped in, or fail to contact, the bottom of the tooth space.

OBJECT OF THE INVENTION

The invention proposes a method for generating a tooth profile of a wheel engaging with a roller pinion which enables the wheel and pinion pair to operate in spite of considerable variations in centre-to-centre spacing.

SPECIFICATION OF THE INVENTION

To achieve this aim, a method is proposed for generating a tooth space profile extending between two teeth of a wheel engaging with a roller pinion in a reference plane perpendicular to a central axis whose intersection with the reference plane defines a centre, comprising the steps of:
 Defining, in the reference plane, a radial reference axis of a tooth space passing through the centre;
 Defining a first tooth side profile comprising a trochoidal active portion intended to come into contact with a roller and extending to a circle delimiting a crest of the teeth, and a bottom portion extending until it intersects the radial reference axis at a bottom point on a tangent perpendicular to the radial axis;
 Defining a second side profile, symmetrical to the first profile with respect to the radial axis, so that the first and second profiles define a nominal tooth space profile suitable for receiving a roller which comes into contact without clearance with the facing active portions of the first and second profiles on a primitive diameter of the wheel.

According to the invention, the method comprises the following steps, performed before the step of defining the second profile:
 Deforming the bottom portion of the first profile so that the bottom point is brought nearer to the centre by an amount equal to a given radial clearance JR;
 Moving the first profile angularly through a given angular half-clearance Jα around the centre to shift it away from the radial axis.

These two transformations of the nominal tooth space make it possible to accommodate a variation of the centre-to-centre spacing between the wheel and the roller pinion which tends to bring the pinion nearer to the wheel. In particular, the radial clearance JR allows a roller to penetrate into the tooth space in which it is engaged as a result of the reduction in the centre-to-centre spacing, while the angular clearance Jα makes it possible to avoid trapping the roller in the tooth space. The part of the bottom portion near the radial reference axis should then be slightly deformed to connect this part to the reference axis on a perpendicular tangent.

BRIEF DESCRIPTION OF THE DRAWINGS

The invention will be more readily understood from the following description of a particular non-limiting embodiment of the method of the invention, given with reference to the attached drawings, of which:
FIG. 1 is a perspective view of a gear wheel engaging with a roller pinion, the teeth of the gear wheel being defined according to the invention;
FIGS. 2A and 2B are sections taken along a plane perpendicular to the axes of rotation of the gear wheel and the roller pinion of FIG. 1, during operation with the nominal centre-to-centre spacing and during operation with a reduced centre-to-centre spacing, respectively;
FIG. 3 is a diagram showing the generation of the first and second tooth profile according to the method of the invention.

DETAILED DESCRIPTION OF THE INVENTION

Figure 4:
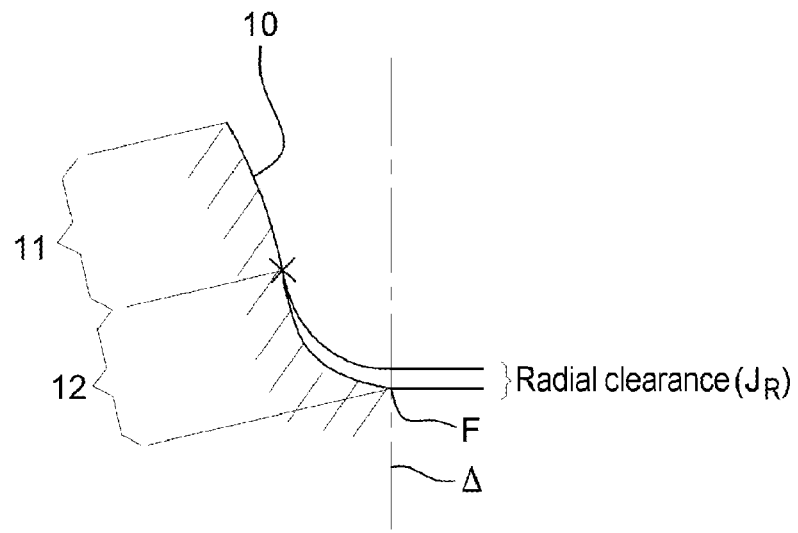
FIG. 4 is a diagram showing the establishment of the radial clearance according to the invention.
Figure 5:
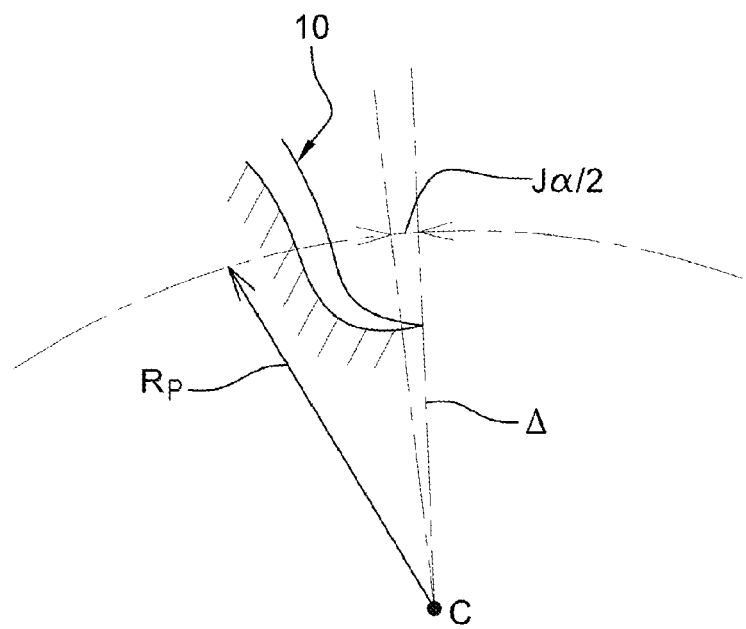
FIG. 5 is a diagram showing the establishment of the angular clearance according to the invention.

The invention is applied to a gear wheel 1 engaging with a pinion 2 having rollers 3 as shown in FIG. 1. The gear wheel 1 is mounted so as to rotate about an axis X1, while the pinion 2 is mounted so as to rotate about an axis X2 parallel to the axis X1 of the gear wheel, and spaced apart from the latter by a nominal centre-to-centre spacing e. FIG. 2A shows the operation of the pair formed by the gear wheel 1 and the roller pinion 2 with a nominal centre-to-centre spacing. The gear wheel 1 comprises teeth 4 defining tooth spaces 5 into which the rollers 3 penetrate to come into contact with the active portion of one of the sides 10 of the teeth 4. It will be seen that, for the roller 3 contacting the side 10 at a primitive radius Rp of the teeth of the gear wheel 1, there is a radial clearance JR between the roller and the bottom of the tooth space, and an angular clearance Jα between the roller and the facing side. The usefulness of this arrangement can be seen in FIG. 2B which shows the operation of the pair formed by the gear wheel 1 and the roller pinion 2 with a centre-to-centre spacing reduced relative to the nominal centre-to-centre spacing by a value equal to the radial clearance JR. The roller 3 then fits into the bottom of the tooth space without interference, and is not trapped because of the angular clearance Jα that has been established. FIGS. 3, 4 and 5 explain the definition of the profiles of the sides 10 which enable the radial clearance JR and the angular clearance Jα to be established.

FIG. 3 illustrates the definition of nominal tooth profiles, defining a nominal tooth space before the clearances are established. This figure shows the centre C at the intersection of the central axis X1 with a reference plane perpendicular to the axis X1. A radial reference axis Δ is defined. The profiles of the sides 10 extend symmetrically on either side of the radial reference axis Δ between an outer circle with a radius Rt delimiting the crest of the teeth, and an inner circle with a radius Rf delimiting the bottom of the teeth. To begin with, a first profile is delimited, on the left-hand profile in this figure, the second profile being obtained by symmetry with respect to the radial reference axis to define a nominal tooth space profile. The tooth profiles comprise, in a conventional way, a first trochoidal active portion 11 and a second bottom portion 12 intersecting the radial reference axis Δ at a bottom point F on a tangent perpendicular to the radial reference axis Δ. The second side profile 10 (on the right in the figure) is found by symmetry with respect to the radial reference axis Δ, so that, at the primitive radius Rp, a roller can fit into the tooth space thus defined while contacting the two profiles without a clearance.

FIG. 4 shows the establishment of the radial clearance JR by modification of the first profile. The bottom portion 12 is hollowed out to shift the bottom point F towards the centre C along the radial reference axis Δ by an amount equal to the radial clearance JR to be established, while preserving the direction of tangency, which is perpendicular to the radial reference axis Δ.

FIG. 5 shows the establishment of the angular clearance Jα after the deformation of the profile carried out as described above. This consists in angularly shifting the previously deformed profile by rotating it through an angle of Jα/2 to move it away from the radial reference axis Δ. The bottom of the profile is then slightly deformed to bring the bottom point F on to the radial reference axis Δ while preserving the direction of tangency.

The tooth space profile 5 is then obtained by supplementing the first profile thus deformed with the second tooth profile, obtained by symmetry with respect to the radial reference axis Δ of the first profile thus deformed according to the invention. This tooth space enables the pair formed by the gear wheel 1 and the roller pinion 2 to operate with a reduced centre-to-centre spacing.

The invention is not limited to what has been described above, but on the contrary incorporates any variant falling within the scope defined by the claims.

The invention claimed is:

1. A method for generating a tooth space profile (5) between two teeth (4) of a wheel (1) engaging with a roller (3) pinion (2) in a reference plane perpendicular to a central axis (X1) whose intersection with the reference plane defines a centre (C), comprising the steps of:

defining, in the reference plane, a radial reference axis (Δ) of a tooth space passing through the centre (C);

defining a first tooth side profile comprising a trochoidal active portion (11) intended to come into contact with a roller and extending to a circle delimiting a crest of the teeth, and a bottom portion (12) extending until it intersects the radial reference axis at a bottom point (F) on a tangent perpendicular to the radial reference axis;

defining a second tooth side profile, symmetrical to the first tooth side profile with respect to the radial reference axis, to delimit a nominal tooth space suitable for receiving a roller which comes into contact without clearance with the active portions of the first and second tooth side profiles at a level of a primitive diameter; and modifying the nominal tooth space to obtain the tooth space profile by the following steps:

deforming the bottom portion (12) of the first tooth side profile so that the bottom point is brought nearer to the centre by an amount equal to a given radial clearance (JR);

moving the previously deformed first tooth side profile angularly through a given angular half-clearance (Jα) around the centre to shift the previously deformed first tooth side profile away from the radial reference axis; and deforming the second tooth side profile symmetrically, with respect to the radial reference axis, to the first tooth side profile as defined in the previous two steps.

* * * * *